United States Patent
Max

(10) Patent No.: US 6,565,715 B1
(45) Date of Patent: May 20, 2003

(54) LAND-BASED DESALINATION USING BUOYANT HYDRATE

(75) Inventor: Michael David Max, Washington, DC (US)

(73) Assignee: Marine Desalination Systems LLC, Washington, DC (US)

( * ) Notice: Subject to any disclaimer, the term of this patent is extended or adjusted under 35 U.S.C. 154(b) by 0 days.

(21) Appl. No.: 09/350,906

(22) Filed: Jul. 12, 1999

(51) Int. Cl.⁷ .............................. B01D 3/34; B01D 9/02; C02F 1/00
(52) U.S. Cl. ...................... 203/10; 62/533; 203/100; 203/27; 203/49; 203/DIG. 8; 203/DIG. 17; 203/48; 210/737; 210/774
(58) Field of Search ................ 203/10, 23, DIG. 17, 203/49, 100, 11, 48, 2, 27, DIG. 8; 62/532, 533; 210/704, 707, 737, 774; 23/295, 300

(56) References Cited

U.S. PATENT DOCUMENTS

| 135,001 | A | 1/1873 | Meylert |
| 2,904,511 | A | 9/1959 | Donath ..................... 210/211 |
| 2,974,102 | A | 3/1961 | Williams ................... 210/711 |
| 3,027,320 | A | 3/1962 | Buchanan .................. 210/711 |
| 3,119,771 | A | 1/1964 | Cottle ....................... 210/711 |

(List continued on next page.)

FOREIGN PATENT DOCUMENTS

| JP | 55055125 | 4/1980 |
| JP | 58109179 | 6/1983 |
| JP | 59029078 | 2/1984 |
| JP | 61025682 | 2/1986 |
| JP | 11319805 | 11/1999 |
| JP | 2000202444 | 7/2000 |
| RU | SU997715 | 2/1983 |
| RU | SU1006378 | 3/1983 |
| WO | WO01/34267 A1 | 5/2001 |

OTHER PUBLICATIONS

Patent Abstracts of Japan, vol. 2000, No. 02, Feb. 29, 2000 and JP 11 319805 A, Nov. 24, 1999 (abstract).
Database WPI, Section Ch, Week 198812, Derwent Publications Ltd., London, GB; Class D15, AN 1988–082320, XP002143497 & SU 1 328 298 A (Odessa Refrig Ind Res), Aug. 7, 1987, (abstract).

(List continued on next page.)

Primary Examiner—Virginia Manoharan
(74) Attorney, Agent, or Firm—Pillsbury Winthrop LLP

(57) ABSTRACT

Methods and apparatus for desalination of salt water (and purification of polluted water) are disclosed. Salt water is pumped to a desalination installation and down to the base of a desalination fractionation column, where it is mixed with hydrate-forming gas to form positive buoyant hydrate. The hydrate rises and dissociates (melts) into the gas and pure water. In preferred embodiments, residual salt water which is heated by heat given off during formation of the hydrate is removed from the system to create a bias towards overall cooling as the hydrate dissociates endothermically at shallower depths. In preferred embodiments, the input water is passed through regions of dissociation in heat-exchanging relationship therewith so as to be cooled sufficiently for hydrate to form at pressure-depth. The fresh water produced by the system is cold enough that it can be used to provide refrigeration, air conditioning, or other cooling; heat removed from the system with the heated residual water can be used for heating or other applications.

5 Claims, 7 Drawing Sheets

U.S. PATENT DOCUMENTS

| | | | |
|---|---|---|---|
| 3,119,772 A | 1/1964 | Hess et al. | 210/711 |
| 3,126,334 A | 3/1964 | Harlow | 210/712 |
| 3,132,096 A | 5/1964 | Walton | 210/711 |
| 3,148,143 A | 9/1964 | Donath | 210/711 |
| 3,155,610 A | 11/1964 | Williams | 210/710 |
| 3,171,727 A | 3/1965 | Brown | 62/532 |
| 3,214,371 A | 10/1965 | Tuwiner | |
| 3,217,505 A | 11/1965 | Tuwiner | 585/15 |
| 3,243,966 A | 4/1966 | Glew | 62/533 |
| 3,308,063 A | 3/1967 | Hess et al. | |
| 3,350,299 A | 10/1967 | Hess et al. | |
| 3,350,300 A | 10/1967 | Hess et al. | |
| 3,371,035 A | 2/1968 | Jacobs et al. | |
| 3,675,436 A | 7/1972 | Ganiaris | |
| 3,712,075 A | 1/1973 | Smith et al. | |
| 3,813,892 A | 6/1974 | Johnson et al. | |
| 3,856,492 A | 12/1974 | Klass | |
| 3,892,103 A | 7/1975 | Antonelli | |
| 3,983,032 A | 9/1976 | Hess et al. | |
| 3,992,170 A | 11/1976 | Karnofsky | |
| 4,170,328 A | 10/1979 | Kirk et al. | |
| 4,207,351 A | 6/1980 | Davies | |
| 4,267,022 A * | 5/1981 | Pitcher | 203/100 |
| 4,278,645 A | 7/1981 | Filss | |
| 4,376,462 A * | 3/1983 | Elliot et al. | 166/267 |
| 4,392,959 A | 7/1983 | Coillet | |
| 4,424,858 A * | 1/1984 | Elliot et al. | 166/52 |
| 4,643,832 A | 2/1987 | Iniotakis et al. | |
| 4,652,375 A | 3/1987 | Heilweil et al. | |
| 4,670,159 A | 6/1987 | Garrett et al. | |
| 4,678,583 A | 7/1987 | Willson, III et al. | |
| 4,686,833 A | 8/1987 | Hino et al. | |
| 4,696,338 A | 9/1987 | Jensen et al. | |
| 4,718,242 A | 1/1988 | Yamauchi et al. | |
| 4,767,527 A | 8/1988 | Iniotakis et al. | |
| 4,821,794 A | 4/1989 | Tsai et al. | |
| 5,037,555 A | 8/1991 | Pasternak et al. | |
| 5,055,178 A | 10/1991 | Sugier et al. | 585/15 |
| 5,076,934 A | 12/1991 | Fenton | |
| 5,110,479 A | 5/1992 | Frommer et al. | |
| 5,128,042 A | 7/1992 | Fenton | |
| 5,159,971 A | 11/1992 | Li | |
| 5,167,838 A | 12/1992 | Wilensky | |
| 5,304,356 A | 4/1994 | Iijima et al. | |
| 5,362,467 A | 11/1994 | Sakai et al. | 62/532 |
| 5,364,611 A | 11/1994 | Iijima et al. | |
| 5,397,553 A | 3/1995 | Spencer | |
| 5,444,986 A | 8/1995 | Hino | |
| 5,448,892 A | 9/1995 | Cheng | |
| 5,473,904 A | 12/1995 | Guo et al. | |
| 5,497,630 A | 3/1996 | Stein et al. | |
| 5,512,176 A | 4/1996 | Blair | |
| 5,553,456 A | 9/1996 | McCormack | |
| 5,562,891 A | 10/1996 | Spencer | |
| 5,660,603 A | 8/1997 | Elliot et al. | |
| 5,679,254 A | 10/1997 | Chakrabarti | |
| 5,816,057 A | 10/1998 | Dickey et al. | |
| 5,873,262 A | 2/1999 | Max et al. | |
| 6,028,234 A | 2/2000 | Heinemann et al. | |
| 6,089,022 A | 7/2000 | Zednik et al. | |
| 6,106,595 A | 8/2000 | Spencer | |
| 6,112,528 A | 9/2000 | Rigby | |
| 6,158,239 A | 12/2000 | Max | |
| 6,180,843 B1 | 1/2001 | Heinemann et al. | |
| 6,245,955 B1 | 6/2001 | Smith | |
| 6,296,060 B1 | 10/2001 | McCaslin | |

OTHER PUBLICATIONS

Max et al., "Extraction of Methane from Oceanic Hydrate System Deposits", Offshore Technology Conference, Paper No. 10727, pp. 1–8 (1999).

Max and Lowrie, "Oceanic Methane Hydrates: A "Frontier" Gas Resource", *Journal of Petroleum Geology*, vol. 19(1), pp. 41–56 (Jan. 1996).

Max and Dillon, "Oceanic Methane Hydrate: The Character of the Blake Ridge Hydrate Stability Zone, and the Potential for Methane Extraction", *Journal of Petroleum Geology*, vol. 21(3), pp. 343–357 (Jul. 1998).

Max, M. D., "Oceanic Methane Hydrate: The Character of the Blake Ridge Hydrate Stability Zone, and the Potential for Methane Extraction", Author's correction, *Journal of Petroleum Geology*, vol. 22(2), pp. 227–228 (Apr. 1999).

Max and Lowrie, "Oceanic Methane Hydrate Development: Reservoir Character and Extraction", Offshore Technology Conference, Paper No. 8300, pp. 235–240 (1997).

Max and Chandra, "The Dynamic Oceanic Hydrate System: Production Constraints and Strategies", Offshore Technology Conference, Paper No. 8684, pp. 1–10 (1998).

Max et al., "Methane Hydrate, A special Clathrate: Its Attributes and Potential", Naval Research Laboratory, NRL/MR/6101—97–7926, pp. 1–74 (Feb. 28, 1997).

Viahakis et al., "The Growth Rate of Ice Crystals: The Properties of Carbon Dioxide Hydrate A Review of Properties of 51 Gas Hydrates", Research and Development Progress Report No. 830, Dept. of Interior, PB–217–615, (Nov. 1972).

Campbell et al., "Gravity Wash Column Design, Procurement, and Installation: Followed by Development Tests of the Modified Single–Stage Desalting Pilot Plant at Wrightsville", Office of Water Research and Technology, Washington, DC, W8100689 OWRT7514(1), Contract DI–14–34–001–7514, (1979) pp. 1–74.

A. J. Barduhn, "Desalination by Freezing Processes", Encyclopedia of Chemical Processing and Design, vol. 14, pp. 361–386, (©1982).

Concentration Specialists, Inc., Andover, MA, "OWRT Freezing Pilot Plant Absorption Freezing Vapor Compression (AFVC) 25,000 gpd", Wrightsville Beach, NC, NCSU, (Jan. 1982).

Chicago Bridge and Iron Company (CBI), "OWRT Freezing Pilot Plant Falling Film Indirect Freezing 6,000 gpd", CBI Test Facility Oakbrook, IL (Jan. 1982).

Wiegandt, "Desalination by Freezing", School of Chemical Engineering, Cornell University, Ithaca, NY, pp 1–95, (Mar. 1990).

W. J. Hahn, "Present Status of the Office of Saline Water Freezing Process Program", Wrightsville Beach Test Facility, pp 1–13 (DSP 6/11) and Figs. 1–3.

Rautenbach et al., Entwicklung und Optimierung eines Hydrat–Verfahrens zur Meerwasserentsalzung, Chemie–Ing.–Techn 45 jahrg. 1973/Nr. 5, pp. 259–254.

Siliber, Methane Cooled Desalination Method and Apparatus, USPTO, Defensive Publication T939,007 –Published Oct. 7, 1975.

Japanese Abstract, Journal Number: G0941AAK ISSN No: 0453–0683, 1995, vol. 42, No. 7. Accession Number: 95A0492545, File Segment: JICST–E.

EPO –Patent Abstracts of Japan Publication No. 61136481, Publication date Jun. 24, 1986, Muneschichi, Concentration of Aqueous Solution English language abstract.

EPO –Patent Abstracts of Japan, Publication Number 11319805, Publication Date: 224–11–99, Yoshio, Separation of Gaseous Mixture Utilizing Gas Hydrate and Method for Desalting Seawater –English language abstract.
XP–0021497 SU1328298 English language abstract.

Russian Abstract Publication No. 2166348, May 10, 2001, Mel'nikov et al.

* cited by examiner

LAND-BASED DESALINATION USING BUOYANT HYDRATE

GOVERNMENTAL SUPPORT AND INTEREST

This invention was made with Government Support under Contract Number NBCHC010003 dated Jan. 29, 2001 and issued by the Department of the Interior-National Business Center (DARPA). The Government has certain rights in the invention.

FIELD OF THE INVENTION

In general, the invention relates to desalination or other purification of water using buoyant hydrates to extract fresh water from saline or polluted water. In particular, the invention relates to land-based desalination or purification of saline or polluted water using methodologies which are virtually self-sustaining and which produce a cold water output that is suitable for refrigeration.

BACKGROUND OF THE INVENTION

In general, desalination and purification of saline or polluted water using buoyant gas hydrates is known in the art. See, for example, U.S. Pat. No. 5,873,262 and accepted South African Patent Application No. 98/5681, the disclosures of which are incorporated by reference. According to this approach to water desalination or purification, a gas or mixture of gases which spontaneously forms buoyant gas hydrate when mixed with water at sufficiently high pressures and/or sufficiently low temperatures is mixed with water to be treated at the base of a treatment column. According to prior technology, the treatment column is located at sea. Because the hydrate is positively buoyant, it rises though the column into warmer water and lower pressures. As the hydrate rises, it becomes unstable and disassociates into pure water and the hydrate-forming gas or gas mixture. The purified water is then extracted and the gas is recycled. Suitable gases include, among others, methane, ethane, propane, butane, and mixtures thereof.

The previously known methods of desalination or purification using buoyant gas hydrates rely on the naturally high pressures and naturally low temperatures that are found at open ocean depths below 450 to 500 meters when using pure methane, or somewhat shallower when using mixed gases to enlarge the hydrate stability "envelope." In certain marine locations such as the Mediterranean Sea, however, the water is not cold enough for the requisite pressure to be found at a shallow enough depth. Moreover, many places where fresh water is at a premium are located adjacent to wide, shallow water continental shelves where a marine desalination apparatus would have to be located a great distance offshore.

SUMMARY OF THE INVENTION

The present invention overcomes these limitations and greatly expands use of the buoyant hydrate desalination fractionation method, as well as increases the efficiency of the method, by providing for land-based desalination (or other purification) of seawater that is pumped to the installation. The methods of the invention can be employed where input water is too warm or where suitably deep ocean depths are not available within reasonable distances for ocean-based desalination to be performed using gas hydrate.

Methods according to the invention entail cooling the seawater to sufficiently low temperatures for positively buoyant gas hydrate to form at the bottom of a desalination fractionation column at pressure-depths and temperatures appropriate for the particular gas or gas mixture being used. A preferred embodiment of the invention capitalizes on the property of the hydrate that the heat given off during formation of the hydrate at depth is essentially equal to the amount of heat absorbed by the hydrate as it disassociate (melts) back into pure water and the hydrate-forming gas. In particular, as the gas rises through the water column and forms hydrate, and as the hydrate crystals continue to rise through the water column and continue to grow, heat released during formation of the hydrate will heat the surrounding seawater in the column. As the hydrate rises in the water column and pressure on it decreases on it—the hydrate formation is driven primarily by the increased pressure at depth—the hydrate dissociates endothermically and absorbs heat from the surrounding water column. Ordinarily, the heat energy absorbed during dissociation of the hydrate would be essentially the same heat energy released during exothermic formation of the hydrate such that there would be essentially no net change in the amount of heat energy in the system.

According to the preferred embodiment of the invention, however, heat energy that is liberated during formation of the hydrate is removed from the system by removing residual saline water from the water column, which residual saline water has been heated by the heat energy released during exothermic formation of the hydrate. Because formation of the hydrate is primarily pressure driven (as opposed to temperature driven), the hydrate becomes unstable under reduced pressures as it rises through the water column, and it dissociates endothermically. Because some heat energy released during exothermic crystallization has been removed from the system, the hydrate will absorb heat from other sources as it melts, thereby creating a cooling bias. The preferred embodiment of the invention capitalizes on this cooling bias by passing the source water through the dissociation region of the water column, in heat-exchanging relationship therewith, so as to cool the source or supply water to temperatures sufficiently low for hydrate to form at the maximum depth of the installation.

In alternative embodiments of the invention, the input water may or may not be passed through the dissociating hydrate in heat-exchanging relationship therewith to be cooled. In either case, the input water is (further) cooled using other, artificial means of refrigeration. Some heat energy is removed from the system by removing warmed water which has circulated around the desalination fractionation column in a water jacket and which has been heated by heat released during hydrate formation.

In the various embodiments of the invention, the purified water will be extremely cool. Advantageously, this cooled water, which preferably will be used as potable water, can itself be used as a heat sink to provide cooling, e.g., refrigeration as a basis for air conditioning in extremely hot climates.

An additional advantage of land-based desalination or water purification according to the invention is that the installation is not subject to disturbances caused by foul weather and bad sea conditions nearly to the same extent as a marine site is. Additionally, access to an installation on land is far easier than access to a marine-based installation would be. Gas handling and storage facilities are more practicable on shore, where there is more space and a more secure engineering environment available. Construction is easier on land, and security may be improved as compared to a marine-based installation.

Moreover, because considerable amounts of residual seawater may be extracted from the system (to remove heat energy from the system), the hydrate slurry will be concentrated. This means that there will be less saline water in the upper, dissociation regions of the dissociation fractionation column, and therefore there will be less residual seawater for the buoyant hydrate to rise through as it dissociates. Thus, less salt will be present to contaminate the fresh water produced by dissociation of the hydrate.

Furthermore, because the residual seawater preferably is recirculated through the desalination fractionation column one or more times, other components such as trace elements which are in the seawater (e.g., gold) may be concentrated so that recovery from the seawater becomes practical.

BRIEF DESCRIPTION OF THE DRAWINGS

The invention will now be described in greater detail in connection with the drawings, in which.

DETAILED DESCRIPTION OF THE PREFERRED EMBODIMENTS

Figure 1:
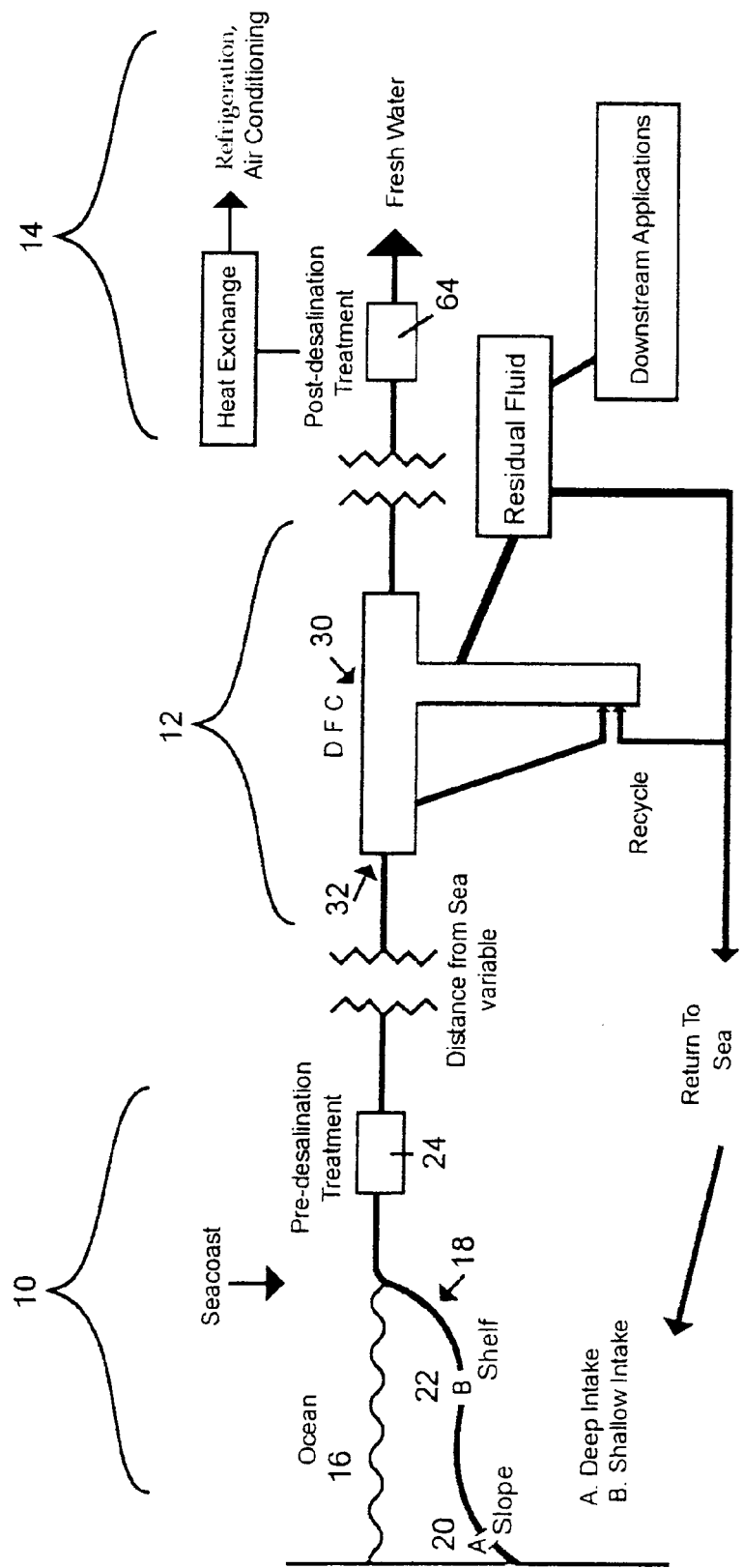
FIG. 1 is a diagrammatic depiction of a land-based desalination installation.

A land-based desalination installation is shown schematically in FIG. 1 in generalized fashion. The installation may be divided roughly into three sections or regions: an intake portion 10; a water purification portion 12; and post-processing and downstream usage section 14.

The intake portion 10 consists essentially of the apparatus and various subinstallations necessary to extract seawater from the ocean 16 and transport it to the desalination/purification installation at region 12, including subaquatic water intake piping 18 and pumping means (not shown) to draw the water from the ocean and pump it to shore for subsequent processing. Large volume installations can be located relatively close to the sea to reduce the piping distance of the input water to a minimum, and establishing the installation as close to sea level as possible will reduce the cost of pumping against pressure head.

The intake pipeline 18 preferably extends sufficiently out to sea that it draws deep water, e.g., from the slope 20 of the continental shelf because deep water is more pure and colder than shallow water. Alternatively, water may be drawn from locations closer to land, e.g., from areas on the continental shelf 22 where the distance across the shallow water is too great for practice. The precise depth from which water is drawn will ultimately be determined by a number of factors, including primarily the specific embodiment of the desalination fractionation column which is employed, as described below. Additionally, the water may be pretreated at a pretreatment station 24. Pretreatment consists mainly of filtering to remove particulate matter and degassing, consistent with the requirement that material necessary for hydrate nucleation not be removed from the water.

Figure 2:
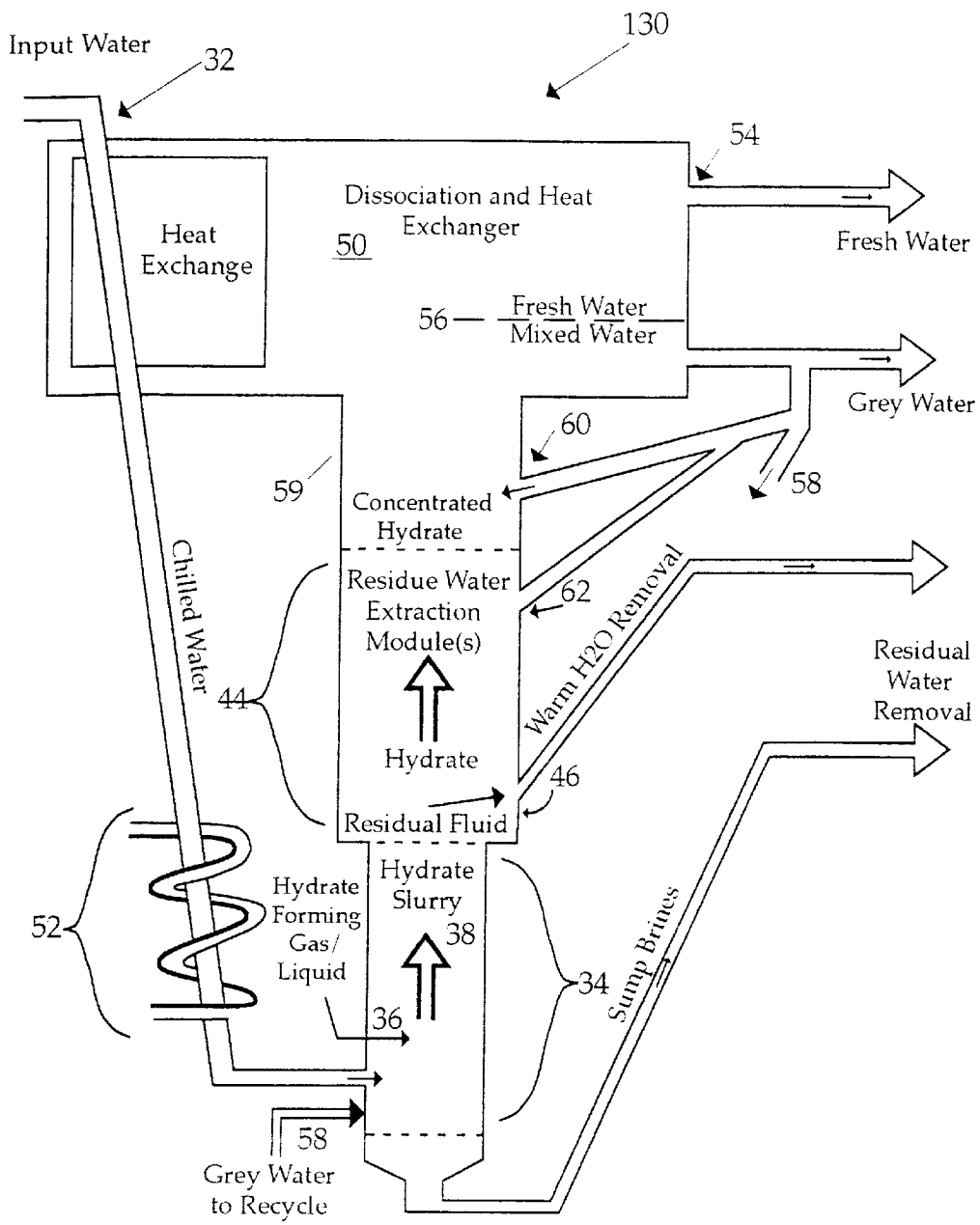
FIG. 2 is a diagrammatic, side elevation view of one embodiment of a desalination fractionation column employed in the installation shown in FIG. 1.
Figure 2A:
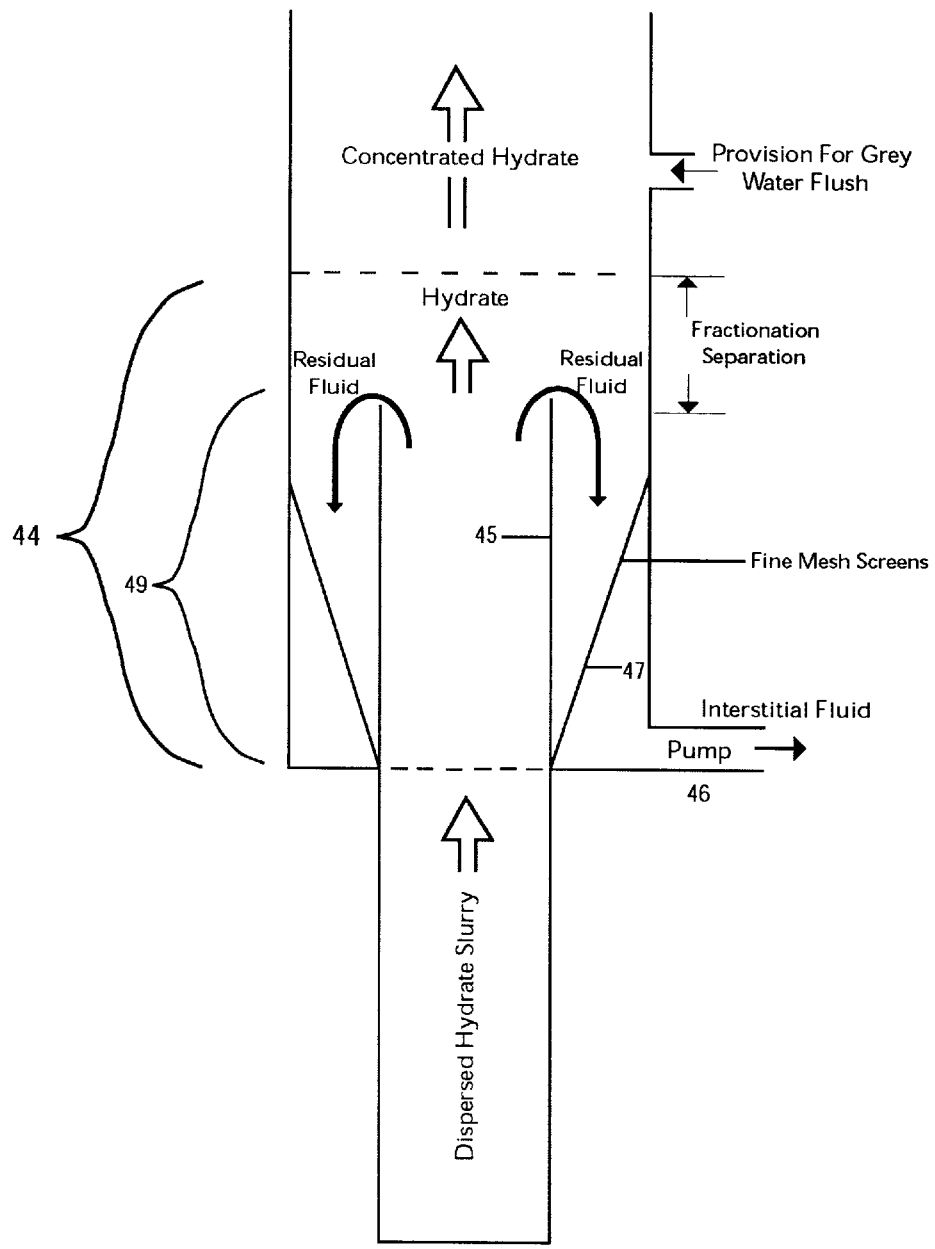
FIGS. 2A and 2B are diagrammatic, side elevation views showing two alternative heat extraction portions of a desalination fractionation column employed in the installation shown in FIG. 1.
Figure 2B:
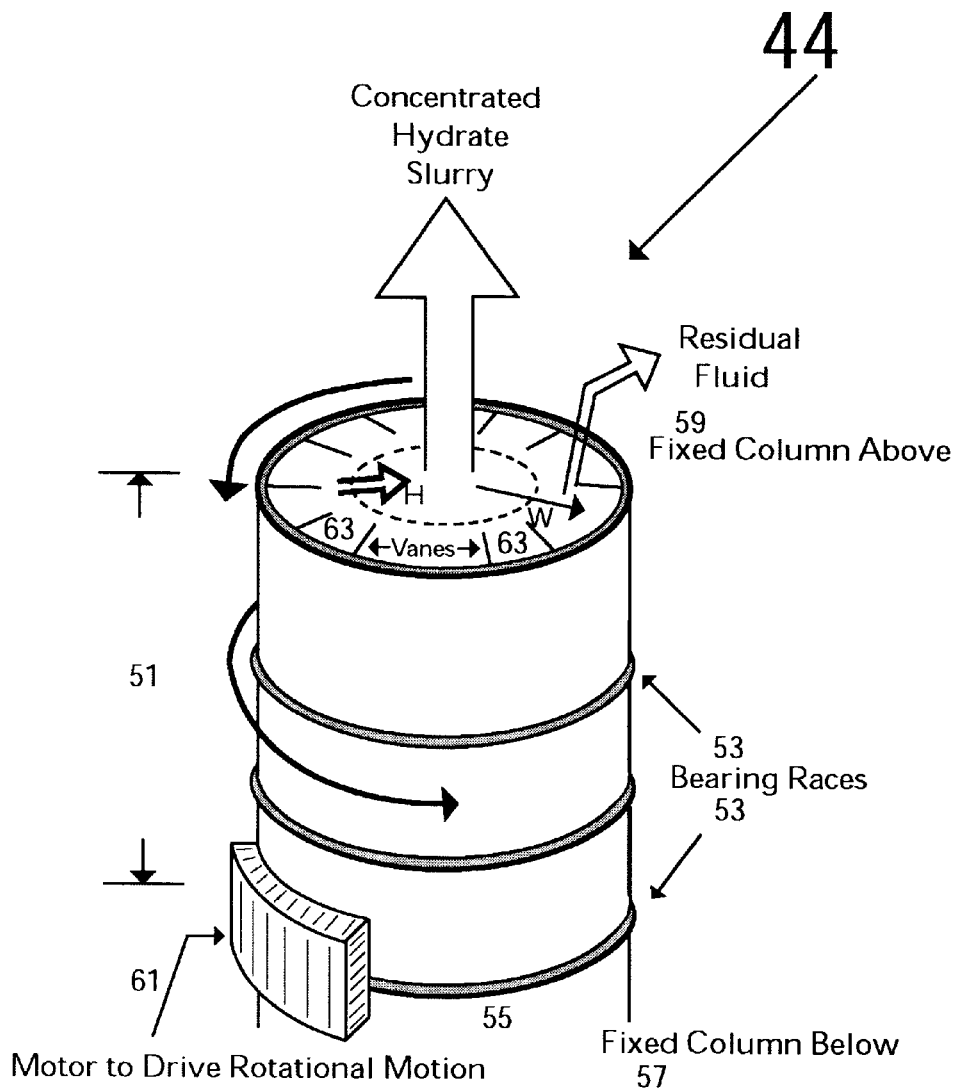

A preferred embodiment of the purification installation 30, per se, is illustrated in FIGS. 2, 2A, and 2B. Seawater is pumped into the installation 30 at water input 32 and is pumped down to the lower, hydrate formation section 34 of the installation. The bottom of the hydrate formation section is no more than about 800 meters deep, and perhaps even shallower (again depending on the particular gas or gas mixture being used). A suitable, positively buoyant hydrate-forming gas is injected into the hydrate formation section at 36, and positively buoyant hydrate 38 spontaneously forms and begins to rise through the water column, as is known in the art.

The hydrate-forming gas can be pumped using sequential, in-line, intermediate pressure pumps, with the gas conduit extending either down through the fractionation column itself, per se, or down through the input water line so that gas line pressure is counteracted by ambient water pressure. As a result, it is not necessary to use expensive, high pressure gas pumps located on the surface.

Hydrate formation (crystallization) is an exothermic process. Accordingly, as the hydrate forms and rises through the water column—forming a hydrate "slurry" as hydrate crystals continue to nucleate and grow as they rise, until the hydrate-forming gas is used up—the surrounding water, which will increasingly become a concentrated saline "residue," will be heated by the heat energy released during crystallization of the hydrate.

Below a certain salinity, the heated residual seawater will have a relatively decreased density and will rise in the column along with the hydrate 38. When the salinity of the residual seawater rises high enough due to the extraction of fresh water from it, however, the highly saline residual seawater will sink to the bottom of the water column, even when heated. This highly saline residual seawater is collected in sump 40 at the bottom of the fractionation column and is removed.

As the slurry of hydrate and heated residual seawater rises in the fractionation column, heated residual seawater is removed from the system in heat extraction portion 44 of the fractionation column. The heat extraction section 44 is shown in greater detail in FIG. 2A. As illustrated in FIG. 2A, for one mode of separation of hydrate and slurry, water is pumped from the system as part of the vertical fractionation process. This is accomplished through a two-stage process. An internal sleeve 45 allows a primary separation to take place, as a water trap 49 is formed below the top of the sleeve. Hydrate continues to rise, while water floods the entire section 44. Water is pumped from below the level at which hydrate exits from the top of the sleeve through fine conical screens 47. These are designed to obstruct the passage of particulate hydrate. Residual water is drawn off at a slow enough rate that any hydrate that may reside within water drawn toward the screen has a greater tendency to rise buoyantly than the tendency toward downwards or sideways movement associated with the force of suction of the drawn-off water.

An alternative configuration 44' of the heat extraction zone is shown in FIG. 2B. In this configuration, a centrifuge is used to allow a separate, mechanically-driven density fractionation system to operate. In this configuration, a segment 51 of the column is made mobile and capable of rotary movement. The mobile, rotary centrifuge column segment is carried by bearings 53 at the base 55 and at intervals along its height to keep it in vertical alignment with the entirety of the column, and to allow it to rotate with respect to the portions 57, 59 of the column above and below it. This section is motor-driven, using a hydraulic system 61 driven from the surface. Vanes 63 within the centrifuge section will cause the water column to rotate, which vanes are designed based on turbine vane design to cause the hydrate-residual water in the section to rotate without turbulence and with increasing velocity toward the top of the section where residual water is extracted. Gravity "settling" or fractionation works here in a horizontal plane, where the heavier residual water "settles" toward the sides of the column while the lighter, more buoyant hydrate "settles" toward the center of the column. The hydrate continues to rise buoyantly and concentrates in the center of the centrifuge section. It will be appreciated that more than one such centrifuge section may be employed.

As the hydrate rises into the upper, dissociation and heat exchange region 50 of the desalination fractionation column, the depth-related pressures which forced or drove formation of the hydrate dissipate; accordingly, the hydrate which is substantially in the form of a slurry, will be driven to dissociate back into the hydrate-forming gas (or mixture of gases) and fresh water. However, regardless of the particular method used to extract the warmed residual seawater, heat energy in the surrounding seawater which ordinarily (i.e., in the prior art) would be absorbed by the hydrate as it dissociates is no longer available to the hydrate. Therefore, because heat has been removed from the system by extracting warmed residual seawater in the heat extraction portion 44 of the apparatus, a net or overall cooling bias is created in the upper, dissociation and heat exchange portion 50 of the installation.

This cooling bias is capitalized upon to significant advantage. In particular, as indicated schematically in FIG. 2, water being pumped into the system (at 32) is passed in heat exchanging relationship through the regions of dissociating hydrate. For example, it is contemplated that the dissociation and heat exchange portion 50 may be constructed as one or more large, individual ponds on the order of 100 meters across. The input water will pass via a series of conduits through the regions of dissociating hydrate and will be cooled significantly as it does so. In fact, although some initial refrigeration will be required at startup of the process, which initial refrigeration may be provided by heat exchange means 52, the installation eventually will attain a steady-state condition in which the amount of heat energy transferred from the input water to the dissociating hydrate is sufficient to cool the input water to temperatures appropriate for spontaneous formation of hydrate at the particular depth of the dissociation column. Ideally, the input water is stabilized at 4° C. or below. This is because below that temperature, the density of the water increases, which enhances separation of the hydrate-water slurry formed by injections of the gas. Additionally, hydrate nucleation proceeds faster at colder water temperatures. During the start-up period, the system is run in a mode of maximum warm fluid extraction (to create maximum induced thermal bias) before equilibrium or steady-state is reached; although the duration of this start-up period will vary depending on the particular installation parameters, it is believed that once steady-state is reached, the system can be run for extremely long operating periods without being shut down, i.e., periods on the order of years.

Once the hydrate has dissociated into its constituent fresh water and gas or gasses, the fresh water is pumped off, e.a. as at 54, and the gas is captured and recycled. Additionally, a portion of the water in the dissociation and heat exchange region 50 will be "gray water," which is fresh water containing some small portion of salts that have been removed from the hydrate by washing of the hydrate with water. The distinction between the "gray" or mixed water and pure fresh water is indicated schematically by dashed line 56. The gray water may be suitable for drinking, depending on the salt concentration, or for agricultural or industrial use without further processing. The cold, gray water may be recycled back into the fractionation column, either by pumping it back down to the hydrate formation section 34, as indicated at 58; or it may be injected back into the concentrated hydrate slurry at a region of the fractionation column located above the heat extraction portion 44, as indicated at 60, to increase the fluid nature of the hydrate slurry.

As further shown in FIG. 1, in the post-processing and downstream usage section 14, the fresh water preferably is treated by secondary treatment means 64. The secondary treatment means may include, for example, fine filtering, gas extraction, aeration, and other processing required to bring the water to drinking water standard.

Moreover, it is extremely significant that, depending on operating parameters such as temperature of the source water, the amount of residual seawater extracted in the heat extraction section 44, dimensions of the installation, and other parameters such as viscosities of fluids within the system; buoyancy of the hydrate relative to all fluids within the system; salinity and temperature of residual water; the design output requirements of fresh water; salinity and temperature of input water; design cooling requirements; system inefficiencies affecting thermal balance; etc., the fresh water produced will be significantly cooled. This cooled water can be used to absorb heat from other applications or locations such as the insides of buildings, and hence can be used to provide refrigeration or air-conditioning.

Finally, once the seawater has been cycled through the desalination fractionation column and downstream processing applications a desired number of times, the residual, concentrated seawater (which is highly saline in nature) is simply pumped back to sea.

With respect to overall design, engineering, and construction considerations for the system, it is contemplated that the desalination fractionation column 30 will be on the order of 15 to 20 meters in diameter, or even larger. Conventional excavation and shaft-lining methodologies common to the mining and tunneling industry can be used in the construction of the column 30. Overall dimensions will be determined based on the total desired fresh water production desired and relevant thermodynamic considerations. For example, one cubic meter of methane hydrate has the capacity to warm about 90 to 100 cubic meters of water by about 1° C. as it forms, and that same cubic meter of hydrate has the capacity to cool about 90 to 100 cubic meters of water by about 1° C. as it dissociates. (Mixes of suitable gasses have higher heats of fusion, which makes the process more efficient.) Required cooling therefore will, in part, determine hydrate production rates, and hence dimensions of the system and the choice of gas or gases to meet those production rates.

Preferably, the diameter of the residual fluid removal column segment is larger. This facilitates buoyant, upward movement of the hydrate through the water column while first allowing separation of residue water from the hydrate in the heat extraction region 44, and then dissociation and heat exchange in the dissociation and heat exchange region 50.

The dissociation and heat exchange region 50 may be constituted not just by a single dissociation "pool," as shown schematically in FIG. 2, but rather may consist of a number of linked, heat-exchanging devices in a number of different water treatment ponds or pools. The actual depth, size, throughput, etc. will depend on the production rate, which will depend, in turn, on the temperature of the input water, the particular gas or gas mixture used to form the hydrate, the rate at which heat can be removed from the system, etc.

The input of water into the base of the fractionation column can be controlled by a device (not shown) that alters the input throat diameter so as to facilitate mixing of the gas and water, thereby promoting more rapid and complete hydrate formation. Alternatively or additionally, hydrate formation can be enhanced by creating flow turbulence in the input water, just below or within the base of the hydrate forming gas injection port 36. It may further be desirable to vary the diameter of the desalination fraction column in a manner to slow the buoyant ascent of the hydrate slurry, thereby enhancing hydrate formation.

The dissociation and heat exchange region 50 will be significantly wider and larger than the lower portions of the desalination column. This is because hydrate will be floating up into it and dissociating into gas and fresh water at a rate that is faster than that which could be accommodated in a pool that is the diameter of the column itself. Because hydrate floats, fresh water tends to be produced at the top of the section, promoting minimum mixing. To inhibit unwanted dissociation, the heat exchanger apparatus may extend downward to the top of the residual water removal section. The dissociation and heat exchange pools do not need to be centered over the water column; moreover, more than one desalination fractionation column may feed upward into a given dissociation and heat exchange pool. Similarly, groups of desalination fraction columns can be located close together so as to be supported by common primary and secondary water treatment facilities, thereby decreasing installation costs and increasing economy.

In addition to large-scale installations, relatively small-scale installations are also possible. For these installations, smaller diameter desalination columns can be constructed in locations where lower volumes of fresh water are required. Although overall efficiency of such systems will be lower than larger scale systems, the primary advantage of such small-scale installations is that they can be implemented using standard drilling methods. Furthermore, mass-produced, prefabricated desalination apparatus sections can be installed in the casings of drilled holes; this allows the installation to be completed in a relatively short period of time. Capital cost of such an installation also is reduced, as fabrication of the components can be carried out on an industrialized basis using mass production techniques. The various operating sections of a smaller-scale installation might be replaced by extracting them from their casing using conventional drilling and pipeline maintenance techniques.

Figure 3:
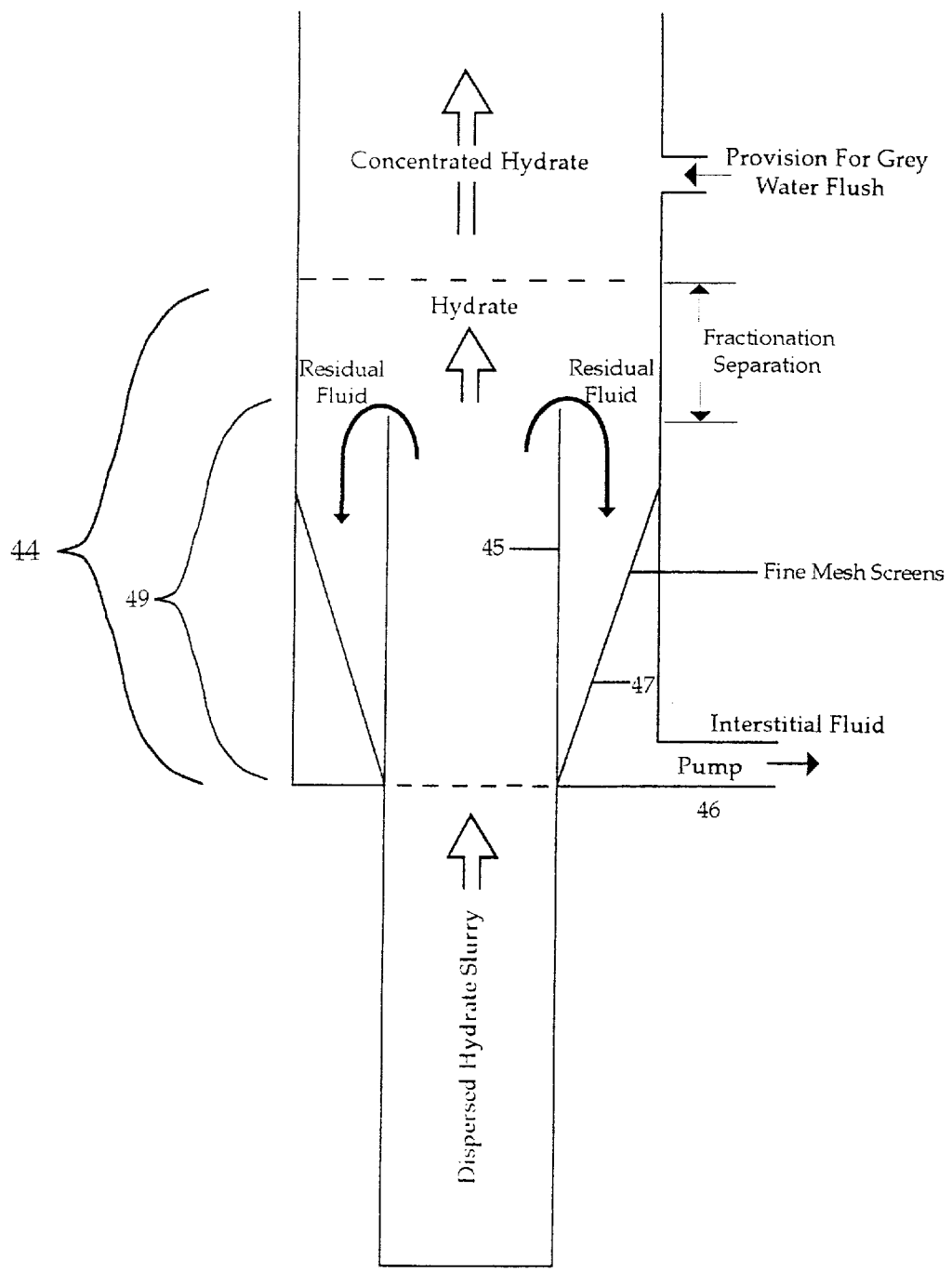
FIG. 3 is a diagrammatic, side elevation view of another embodiment of a desalination fractionation column employed in the installation shown in FIG. 1.

An alternate, slightly simplified embodiment 130 of a desalination fractionation column according to the invention is shown in FIG. 3. In this embodiment, hydrate formation occurs essentially within a thermal equilibration column 132. The thermal equilibration column 132 has an open lower end 134 and is suspended in shaft 136. In this embodiment, input water is injected near the base of the desalination fractionation column 130, e.g. as at 138, preferably after passing through heat exchange and dissociation region 150 of the column 130 in similar fashion to the embodiment shown in FIG. 2. Hydrate-forming gas is injected into the lower portions of the thermal equilibration column 132, as at 140, and hydrate will form and rise within the column 132 much as in the previous embodiment.

The embodiment 130 is simplified in that heat of formation of the hydrate is transferred to water surrounding the thermal equilibration column 132 within a "water jacket" defined between the walls of the column 132 and the shaft 136 in which the desalination fractionation column is constructed. To this end, the hydrate formation conduit preferably is made from fabricated (i.e., "sewn") artificial fiber material, which is ideal because of its light weight and its potential for being used in an open weave that greatly facilitates thermal equilibration between residual saline water within the thermal equilibration column 132 and seawater circulating within the water jacket.

Figure 4:
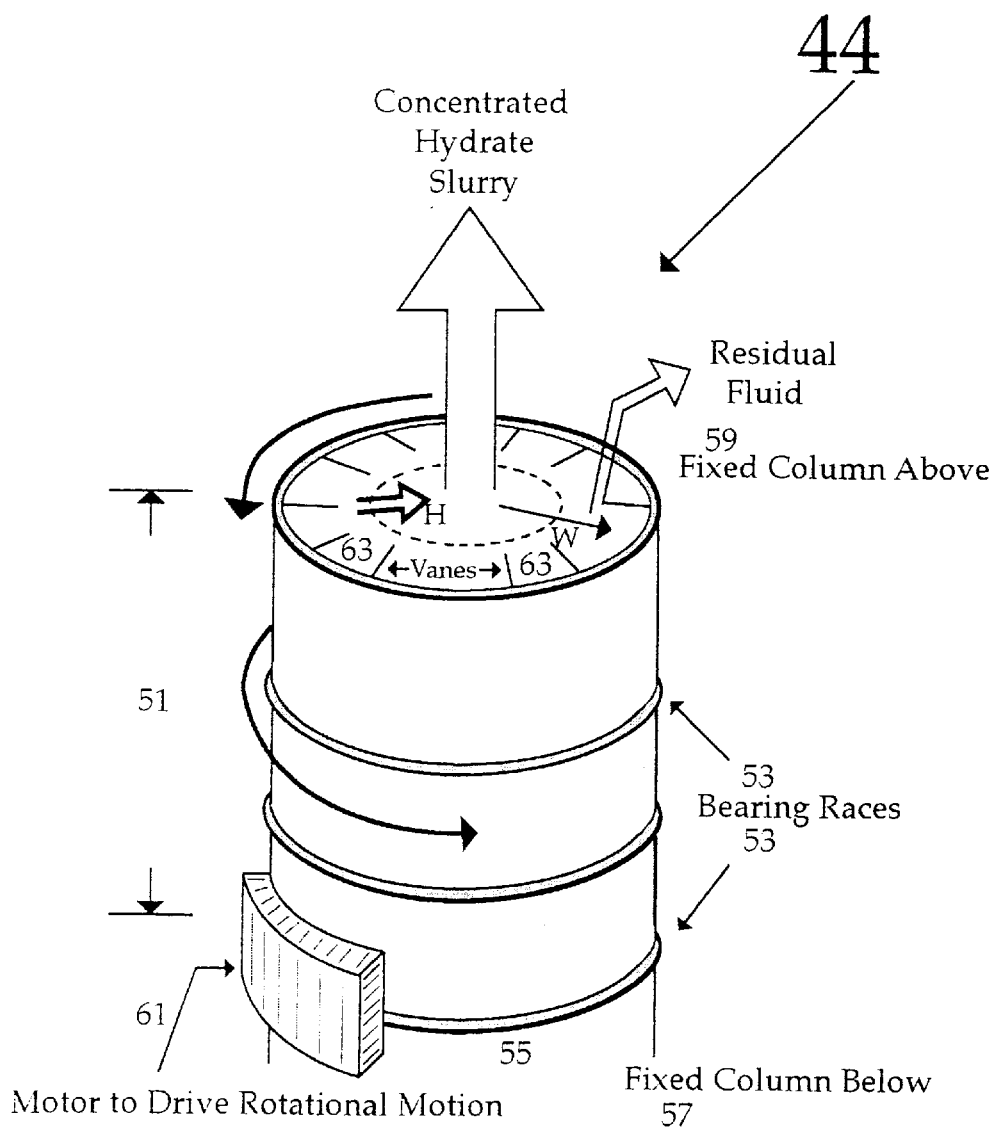
FIG. 4 is a diagrammatic, side elevation view showing overlapping water vent joint used in the desalination fractionation column shown in FIG. 3.

As is the case with the embodiment shown in FIG. 2, warmed water is pumped out of the system, this warmed water being water which has circulated within the water jacket. In contrast to the embodiment shown in FIG. 2, however, the intent of removing warmed water from the water jacket is not to remove so much heat energy that the input water is automatically cooled to temperatures suitable for formation of the hydrate at the base of the column, but rather it is simply to remove enough heat energy to prevent water within the interior of the hydrate formation conduit from becoming so warm that hydrate cannot form at all. Accordingly, the rate at which warm water is removed from the water jacket may be relatively small compared to the rate at which warm water is removed from the heat extraction portion 44 of the embodiment shown in FIG. 2. As a result, it is necessary to supplement the cooling which takes place in the heat exchange and dissociation region 150 using supplemental "artificial" refrigeration means 152. Operation is otherwise similar to that of the embodiment shown in FIG. 2: fresh water is extracted from the upper portions of the heat exchange and dissociation portion 150; "grey water" is extracted from lower portions of the heat exchange and dissociation region 150, i.e., from below the line of separation 156; and concentrated brine is removed from brine sump 141. To facilitate "settling out" of brine which is sufficiently dense to be negatively buoyant due to concentration and/or cooling, and to facilitate heat transfer and thermal equilibration, the equilibration column 132 preferably is constructed with overlapping joints, as shown in FIG. 4. This configuration will permit the buoyant hydrate to rise throughout the column, while cooled, more saline water can flow out through the vents 142, as indicated schematically.

Figure 5:
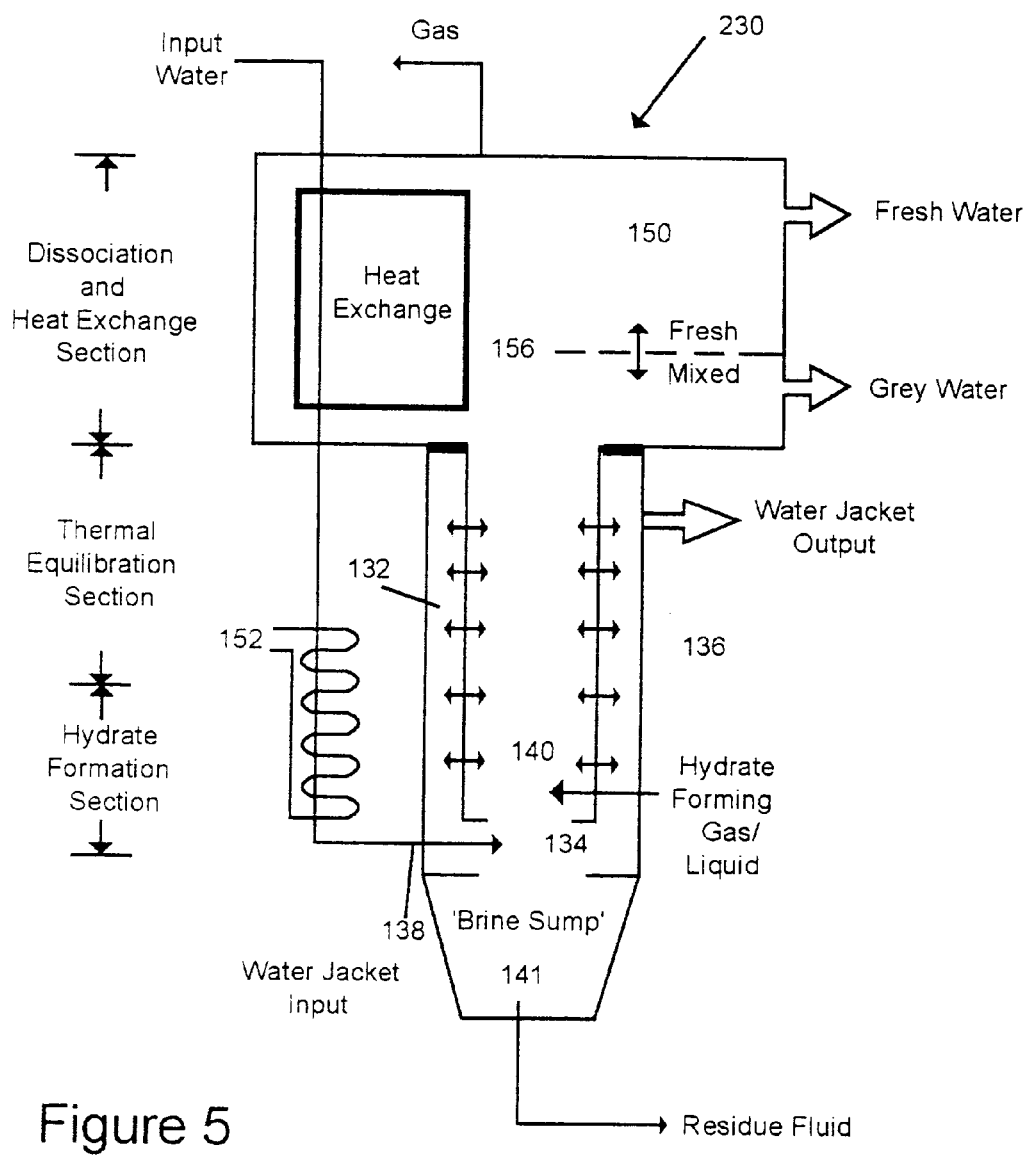
FIG. 5 is a diagrammatic, side elevation view of yet another embodiment of a desalination fractionation column employed in the installation shown in FIG. 1, which embodiment is similar to that shown in FIG. 3.
Figure 1:
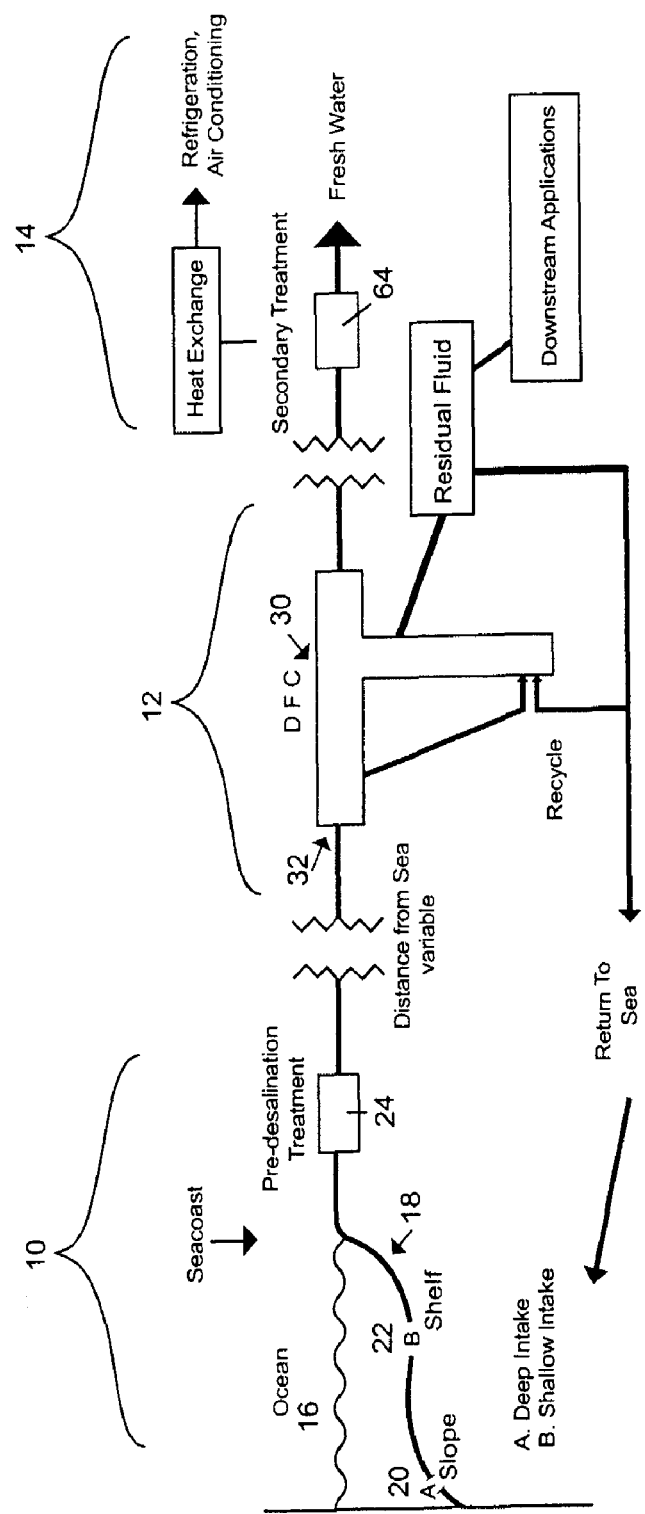
Figure 2:
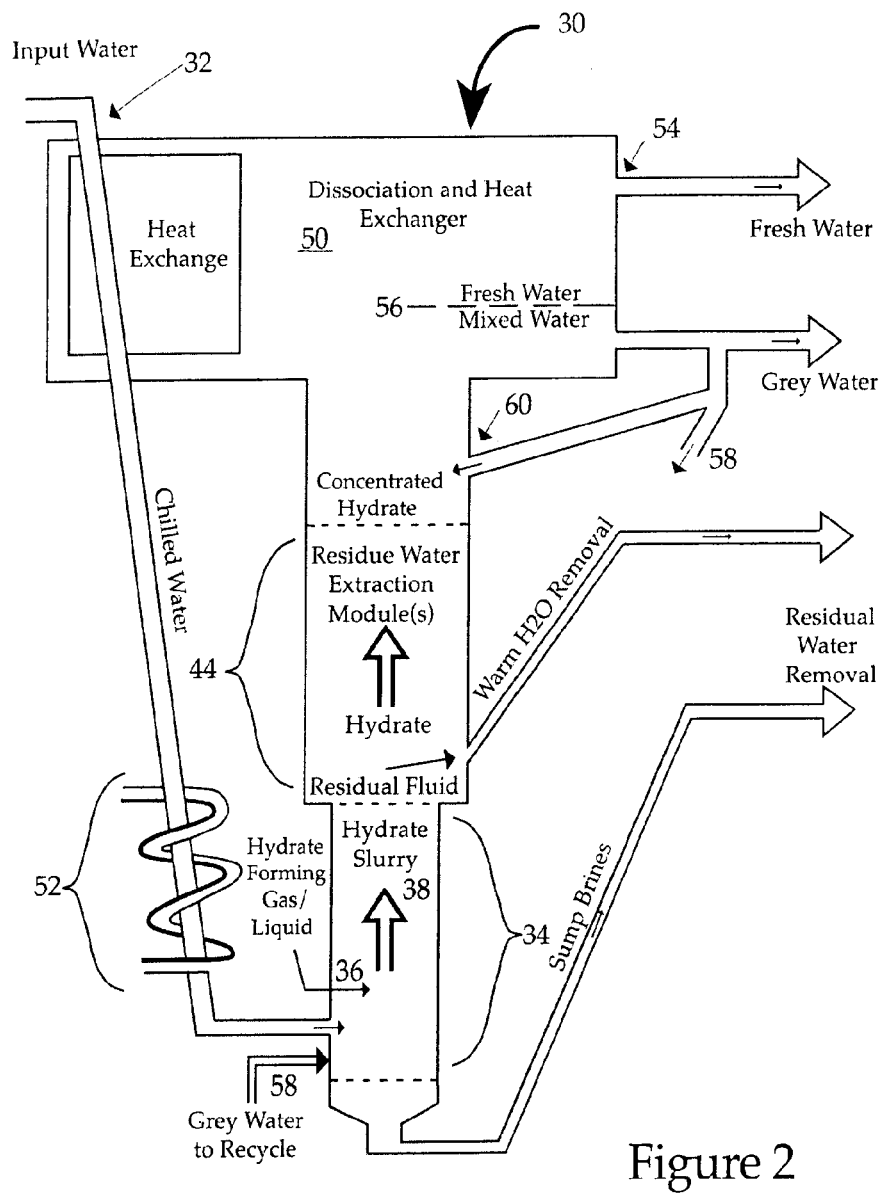
Figure 3:
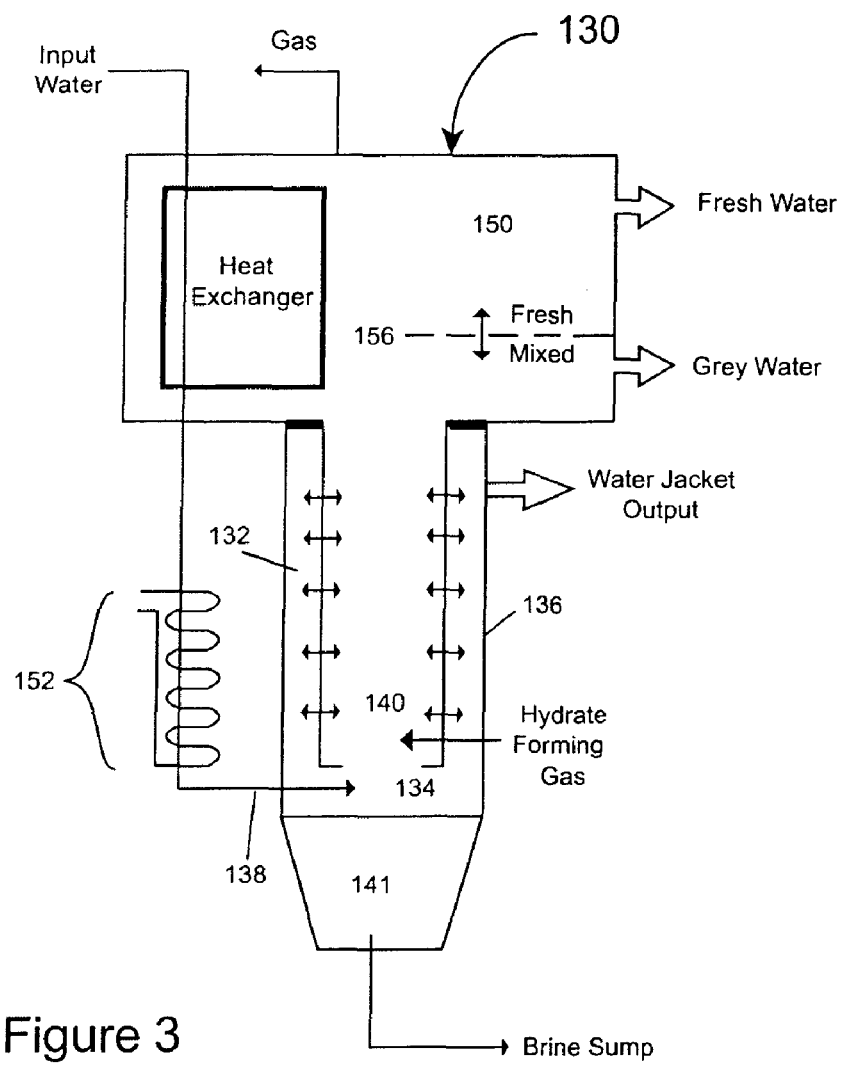
Figure 4:
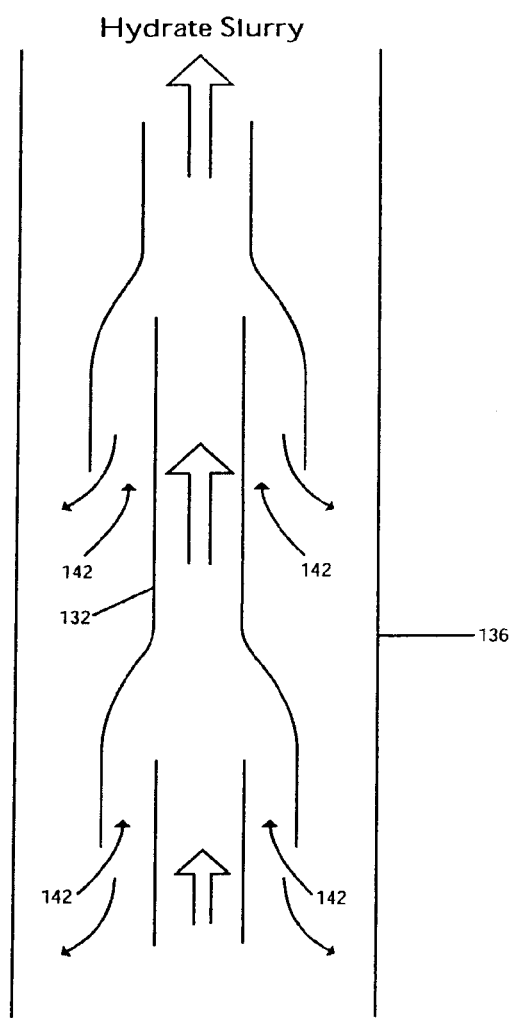
Figure 5:
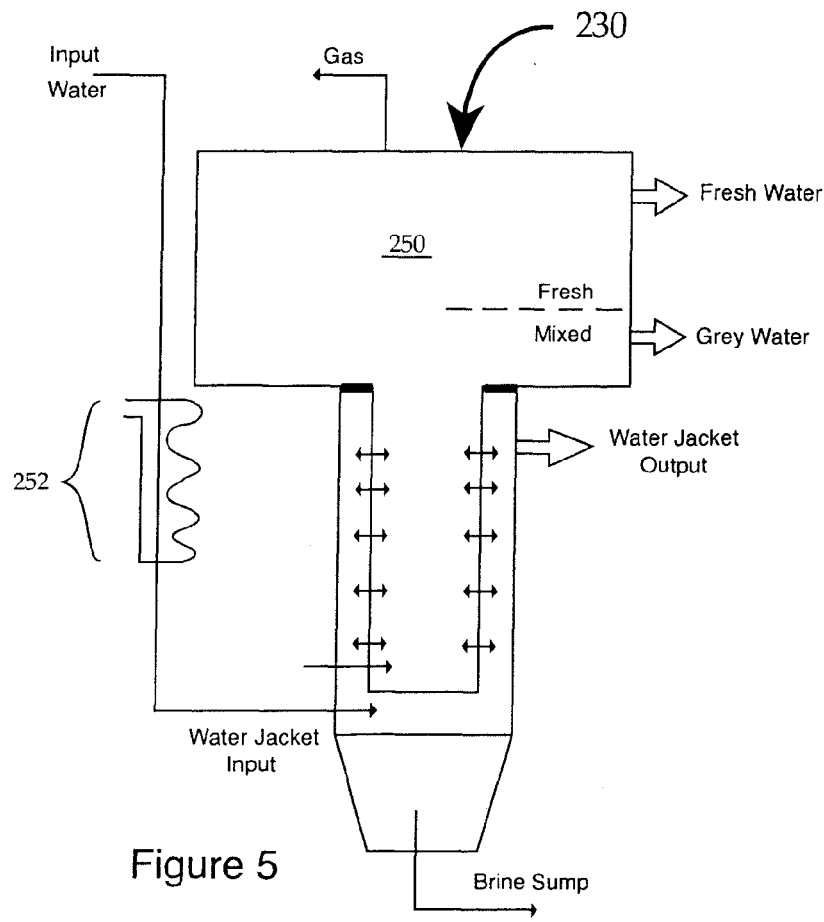

The desalination fractionation column installation may be further simplified by feeding the input water into the system without passing it through the dissociation section 250 of the embodiment 230 shown in FIG. 5. More artificial refrigeration will need to be provided by refrigeration means 252, but operation is otherwise the same as embodiment 130 shown in FIG. 3.

Although particular and specific embodiments of the invention have been disclosed in some detail, numerous modifications will occur to those having skill in the art, which modifications hold true to the spirit of this invention. Such modifications are deemed to be within the scope of the following claims.

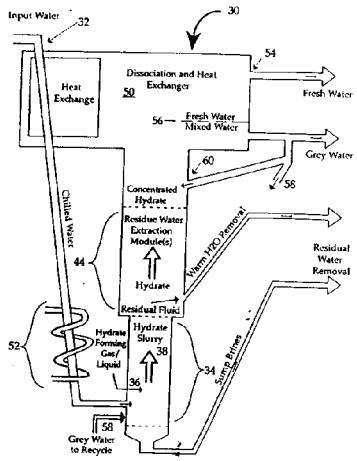

I claim the following:

1. A method of desalinating or purifying saline or polluted input water, respectively, said method comprising:
providing said input water to a hydrate formation region of a desalination fractionation installation that is located in land and causing said input water to be mixed with a hydrate-forming substance under temperature conditions and pressure conditions conducive to formation of hydrate of said hydrate-forming substance such that hydrate spontaneously forms, said desalination fractionation installation comprising a shaft extending downward into the ground to sufficient depth for the weight of water contained therein to naturally produce said pressure conditions conducive to formation of said hydrate at a lower region of said shaft, said hydrate formation of said hydrate at a lower region of said shaft, said hydrate formation region being located within said lower region of said shaft;

extracting heat energy from said desalination fractionation installation by removing residual saline or polluted water that has been warmed by heat of exothermic formation of said hydrate;

providing said hydrate to a hydrate dissociation region of said installation; and allowing said hydrate to dissociate into fresh water and the hydrate-forming substance in a dissociation region of said installation;

said method further comprising at least partially cooling said input water toward said temperature conditions conducive to formation of said hydrate before said input water is mixed with said hydrate-forming substance.

2. The method of claim 1, wherein the input water is at least partially cooled by being passed in heat-exchanging relationship through said dissociation region, whereby heat is absorbed from said input water by said hydrate as said hydrate dissociates endothermically.

3. The method of claim 1, wherein said hydrate-forming substance is gaseous.

4. The method of claim 1, wherein said hydrate-forming substance forms positively buoyant hydrate and wherein said providing said hydrate to said hydrate dissociation region of said installation comprises allowing said hydrate to rise naturally to said hydrate dissociation region.

5. The method of claim 1, wherein said hydrate-forming substance is gaseous and forms positively buoyant hydrate and wherein said providing said hydrate to said hydrate dissociation region of said installation comprises allowing said hydrate to rise naturally to said hydrate dissociation region.

* * * * *

UNITED STATES PATENT AND TRADEMARK OFFICE
CERTIFICATE OF CORRECTION

PATENT NO. : 6,565,715 B1
DATED : May 20, 2003
INVENTOR(S) : Michael D. Max

It is certified that error appears in the above-identified patent and that said Letters Patent is hereby corrected as shown below:

The title page showing the illustrative figure should be deleted to be replaced with the attached title page.

Drawing sheets, consisting of Figs.1,2,3,4, and 5, should be deleted to be replaced with the drawing sheets, consisting of Figs. 1,2,3,4, and 5, as shown on the attached page.

<u>Column 9,</u>
Lines 8-10, please delete "said hydrate formation of said hydrate at a lower region of said shaft,".

Signed and Sealed this

Twentieth Day of July, 2004

JON W. DUDAS
*Acting Director of the United States Patent and Trademark Office*

United States Patent
Max

(10) Patent No.: US 6,565,715 B1
(45) Date of Patent: May 20, 2003

(54) LAND-BASED DESALINATION USING BUOYANT HYDRATE

(75) Inventor: Michael David Max, Washington, DC (US)

(73) Assignee: Marine Desalination Systems LLC, Washington, DC (US)

(*) Notice: Subject to any disclaimer, the term of this patent is extended or adjusted under 35 U.S.C. 154(b) by 0 days.

(21) Appl. No.: 09/350,906

(22) Filed: Jul. 12, 1999

(51) Int. Cl.$^7$ .............................. B01D 3/34; B01D 9/02; C02F 1/00

(52) U.S. Cl. .......................... 203/10; 62/533; 203/100; 203/27; 203/49; 203/DIG. 17; 203/48; 210/737; 210/774

(58) Field of Search ................ 203/10, 23, DIG. 17, 203/49, 100, 11, 48, 2, 27, DIG. 8; 62/532, 533; 210/704, 707, 737, 774; 23/295, 300

(56) References Cited

U.S. PATENT DOCUMENTS

| 135,001 A | 1/1873 | Meylert | |
|---|---|---|---|
| 2,904,511 A | 9/1959 | Donath | 210/211 |
| 2,974,102 A | 3/1961 | Williams | 210/711 |
| 3,027,320 A | 3/1962 | Buchanan | 210/711 |
| 3,119,771 A | 1/1964 | Cottle | 210/711 |

(List continued on next page.)

FOREIGN PATENT DOCUMENTS

| JP | 55055125 | 4/1980 |
|---|---|---|
| JP | 58109179 | 6/1983 |
| JP | 59029078 | 2/1984 |
| JP | 61025682 | 2/1986 |
| JP | 11319805 | 11/1999 |
| JP | 2000202444 | 7/2000 |
| RU | SU997715 | 2/1983 |
| RU | SU1006378 | 3/1983 |
| WO | WO01/34267 A1 | 5/2001 |

OTHER PUBLICATIONS

Patent Abstracts of Japan, vol. 2000, No. 02, Feb. 29, 2000 and JP 11 319805 A, Nov. 24, 1999 (abstract).

Database WPI, Section Ch, Week 198812, Derwent Publications Ltd., London, GB; Class D15, AN 1988–082320, XP002143497 & SU 1 328 298 A (Odessa Refrig Ind Res), Aug. 7, 1987, (abstract).

(List continued on next page.)

*Primary Examiner*—Virginia Manoharan
(74) *Attorney, Agent, or Firm*—Pillsbury Winthrop LLP

(57) ABSTRACT

Methods and apparatus for desalination of salt water (and purification of polluted water) are disclosed. Salt water is pumped to a desalination installation and down to the base of a desalination fractionation column, where it is mixed with hydrate-forming gas to form positive buoyant hydrate. The hydrate rises and dissociates (melts) into the gas and pure water. In preferred embodiments, residual salt water which is heated by heat given off during formation of the hydrate is removed from the system to create a bias towards overall cooling as the hydrate dissociates endothermically at shallower depths. In preferred embodiments, the input water is passed through regions of dissociation in heat-exchanging relationship therewith so as to be cooled sufficiently for hydrate to form at pressure-depth. The fresh water produced by the system is cold enough that it can be used to provide refrigeration, air conditioning, or other cooling; heat removed from the system with the heated residual water can be used for heating or other applications.

5 Claims, 7 Drawing Sheets